United States Patent

Lüpges et al.

[11] Patent Number: 5,921,641
[45] Date of Patent: Jul. 13, 1999

[54] BRAKING DEVICE

[76] Inventors: Peter Lüpges; Dieter Wagels, both of Dessauer Strasse 24, D-41065 Mönchengladbach, Germany

[21] Appl. No.: 08/583,077
[22] PCT Filed: Jul. 1, 1994
[86] PCT No.: PCT/DE94/00767
   § 371 Date: Mar. 21, 1996
   § 102(e) Date: Mar. 21, 1996
[87] PCT Pub. No.: WO95/01898
   PCT Pub. Date: Jan. 19, 1995

[30] Foreign Application Priority Data

Jul. 3, 1993 [DE] Germany ............................. 43 22 157
Jun. 30, 1994 [DE] Germany ............................. 44 22 664

[51] Int. Cl.[6] .................................................. B60D 1/28
[52] U.S. Cl. ........................................ 303/191; 180/271
[58] Field of Search ............................. 180/271; 303/16, 303/28, 25, 191, 15, 3, 20

[56] References Cited

U.S. PATENT DOCUMENTS 3,726,369 4/1973 Esteves .
4,146,108 3/1979 Sato ........................................ 180/271
4,632,208 12/1986 Takayama et al. ..................... 180/271
5,115,162 5/1992 Leonard et al. ....................... 310/339

FOREIGN PATENT DOCUMENTS 89 11 963 11/1989 Germany .
91 10 739 8/1991 Germany .
4-274940 2/1991 Japan .
2250070 11/1990 United Kingdom .

Primary Examiner—Peter M. Poon
Attorney, Agent, or Firm—Kennedy Covington Lobdell & Hickman, LLP

[57] ABSTRACT

A vehicle braking control system utilizes a detection device for actuating the braking of the vehicle based upon a first sensor device which detects rapid changes in position of the driver's foot relative to the gas pedal and for delivering a corresponding signal to the detection device for automatically actuating vehicle braking thereupon, and a second sensor device for detecting movement of the driver's foot from the gas pedal toward the brake pedal and for delivering a corresponding signal to the detection device for actuating the braking of the vehicle thereupon.

16 Claims, 13 Drawing Sheets

Legend

Operational amplifier

Logical element and

Schmitt trigger or filter

Timer
Time function element
Timing pulse generator 8 bit latch
Intermediate memory

BRAKING DEVICE

BACKGROUND OF THE INVENTION

The instant invention relates to a device for braking, and more particularly to a vehicle braking device with a brake control system having a detection device with a first sensor device associated with the gas pedal of the vehicle to supply a first signal to the detection device to signal a rapid reflex-like change of the position of the right foot of the driver relative to the gas pedal and to actuate an automatic triggering of vehicle braking.

In conventionally designed brakes for vehicles, in particular for passenger cars, buses or trucks, wherein the braking process is triggered by actuating the brake pedal with the foot, the braking time is composed of a reflex time, a reaction time, a brake response time and the actual braking time. Within the scope of the instant invention, the time required by the driver to mentally comprehend that braking is necessary is understood to be the reflex time. The reaction time represents that time required to take the right foot of the driver off the gas pedal and to move it in the direction of the brake pedal. This is followed by the brake response time which is a result of the fact that the mechanical and/or hydraulic actions which occur when the brake is pushed require a definite time until the actual braking operation is initiated. The time elapsing between the first contact of the brake with the wheel and the stop of the vehicle is understood to be the braking time.

Depending on the respective condition of the driver and the technical structure of the brake system, the reflex time, the reaction time and the brake response time require approximately 15 to approximately 50 percent of the entire braking time, which can lead to considerable problems in many braking situations in view of the present-day traffic density.

A device for braking a vehicle with a brake control system of the species mentioned at the outset is known from U.S. Pat. No. 4,146,108. A detection device for determining the position of the foot of the driver normally actuating the gas and brake pedal is associated with the brake control system in such a way that during a reflex-like change of the position of the foot on the gas pedal from a first position into a second position the detection device provides a switch with a signal, which automatically triggers the braking process. It is disadvantageous in this prior art that unintended braking is triggered if a rapid foot movement is accidentally performed (for example because the vehicle is just passing through a hole in the road).

SUMMARY OF THE INVENTION

It is the object of the invention to additionally assure in connection with a vehicle braking device utilizing a brake control system with a first sensor device having a first sensor associated with the vehicle gas pedal, that automatic braking is already triggered in case of a reflex-like return of the gas pedal indicated by a first signal of the first sensor, although the foot of the driver may neither move away from the gas pedal at all nor move in the direction toward the brake pedal. This object is attained in accordance with the invention by providing the first sensor device of such a vehicle braking device with another sensor associated with the gas pedal which supplies a second signal to the detection device when the right foot of the driver is removed from the gas pedal, and by arranging the detection device to suppress the first signal of the first sensor until such time that the other sensor indicates by means of a second signal that the foot of the driver is released from the surface of the gas pedal. The present invention further contemplates the provision of the detection device with a second sensor device comprising a third sensor positioned between the gas pedal and the brake pedal of the vehicle for generating a third signal to the detection device caused by movement of the right foot of the driver into a position at the brake pedal, with the detection device being set up to trigger the braking process only as a function of the appearance of the third signal.

In accordance with the invention, the braking process is only triggered when the first signal indicates a reflex-like movement of the foot of the driver and when a second signal occurs. This can be either the second signal which indicates that the foot of the driver has been lifted off the gas pedal, or the third signal which indicates that the foot of the driver moves from the gas pedal to the brake pedal.

In connection with a first alternative of the device in accordance with the invention, this comprises a first sensor device disposed in the area of the gas pedal and consisting of two sensors. In this case the first sensor, which preferably is disposed underneath the gas pedal and is embodied as a pressure sensor, detects the movement of the foot away from the gas pedal, in particular the speed of this movement, while the other sensor detects whether the foot of the driver is still on the gas pedal. To achieve this, the other sensor of the first sensor device is preferably positioned on the surface of the gas pedal facing the driver and in particular comprises a plurality of foil feelers. With this alternative in accordance with the invention the automatic braking process is triggered when the foot of the driver reduces the pressure on the gas pedal in a reflex-like manner and the foot of the driver is simultaneously removed from the surface of the gas pedal which in turn leads to an appropriate signal being supplied to the detection device.

The other alternative of the device in accordance with the invention has a detection device which is equipped with a second sensor device. In this case the second sensor device is arranged in such a way and localized that it detects the position of the right foot of the driver during a foot movement from a first position into the second position or the position of the foot in the second position. In accordance with the invention this second sensor device comprises at least a third sensor positioned in the area between the gas pedal and the brake pedal. In this case this sensor of the second sensor device then generates a third signal when the right foot of the driver moves toward the second position which does not necessarily mean that the right foot of the driver reaches the area of the brake pedal. However, it is particularly practical if this sensor of the second sensor device is disposed relatively close to the gas pedal, so that the third signal is always generated as soon as the foot of the driver is removed reflex-like from the gas pedal and moves in the direction toward the brake pedal.

The device in accordance with the invention for braking a vehicle has a number of advantages. It should be primarily noted that by means of the device in accordance with the invention the entire braking time, and in particularly the stopping distance, are considerably shortened, which is connected with the fact that when using the invention the reaction time described at the outset and the brake response can be saved. If, in a traffic situation requiring braking, the driver of a vehicle equipped with the device in accordance with the invention removes his foot reflex-like from the gas pedal, this leads to the detection device associated with the brake control system detecting this position change so that, based on this reflex of the driver, the braking operation is automatically triggered. Further than that, in such a traffic situation the driver can concentrate considerably better on the traffic, since the braking action is automatically triggered and therefore the attention of the driver is not diverted from the traffic because of the actuation of the brake. This advantage occurs in particular when inexperienced drivers must overcome such traffic situations.

The detection device in accordance with the invention has a first sensor device which is associated with the gas pedal. This first sensor device can be disposed above the gas pedal, in the area of the transmission hump or in the area of the gas pedal plate or the base section of the gas pedal.

Advantageously the first sensor device comprises at least one sensor, for example a first sensor, disposed underneath the gas pedal. This includes, in particular in connection with those sensors which do not detect the position of the right foot of the driver without a contact, that such a sensor disposed underneath the gas pedal does not negatively affect the actuation of the gas pedal.

In connection with the design of the sensor or the sensors of the first sensor device, as well as the sensor devices to be subsequently described, it should in general be noted that it or these sensors should be designed in such a way that it or they is or are able without disruptions to detect the position of the right foot of the driver in the area of the gas pedal or the brake pedal. It is particularly practical if the first sensor device includes a pressure sensor, since in this case the position change of the right foot of the driver in the course of pivoting the gas pedal can be detected particularly easily by means of only a single sensor. It is of course also possible for the first sensor device, or the sensor devices to be subsequently described, to be designed as optical sensors or infrared sensors, where in connection with such sensors it should then be possible recommended to provide at least two sensors.

If the first sensor device has a pressure sensor for detecting the foot on the gas pedal in a first position, a particularly practical embodiment of the device provides that in this case the pressure sensor generates a signal only if the pressure change exceeds a predefined value, in particular a predefined time value or speed value. It is assured by means of this that the signal is not being generated during each speed reduction of the vehicle, generated by an appropriate actuation of the gas pedal, and thus the brake action is automatically triggered. Instead, with this embodiment a signal is only generated if the foot on the gas pedal is moved away from the gas pedal reflex-like and therefore at a high speed or within a short time, so that the braking action is automatically triggered when the signal generated by the pressure sensor appears.

In a particularly suitable and preferred embodiment of the device in accordance with the invention, the device in accordance with the invention includes a first sensor device disposed in the area of the gas pedal and consisting of two sensors. In this case a first sensor, which is preferably disposed underneath the gas pedal as previously described and is embodied as a pressure sensor, detects the movement of the foot away from the gas pedal and in particular the speed of this movement, while it is determined by means of the other sensor whether the foot of the driver is still on the gas pedal. To achieve this, the other sensor of the first sensor device is preferably positioned on the surface of the gas pedal oriented toward the driver and it contains in particular a plurality of foil feelers. With this embodiment of the device in accordance with the invention the automatic braking process is triggered if the foot of the driver reduces the pressure reflex-like on the gas pedal and simultaneously the foot of the driver is removed from the surface of the gas pedal, which in turn results in a second signal being sent to the detection device.

A further embodiment of the device in accordance with the invention comprises a detection device equipped with a second sensor device. Here, the second sensor device is disposed and localized in such a way that the second sensor device detects the position of the right foot of the driver in the course of its movement from the first position into the second position, or the position of the right foot in the second position. Preferably this second sensor device consists of at least one sensor which is positioned in the area between the gas pedal and the brake pedal. In this case the sensor of the second sensor device generates a third signal if the right foot of the driver moves toward the second position, which also does not mean than that the right foot of the driver comes into the area of the brake pedal. However, it is particularly suitable if this sensor of the second sensor device is disposed close to the gas pedal so that the third signal is always generated as soon as the foot of the driver comes off the gas pedal reflex-like and is moved in the direction toward the brake pedal.

In a further development of the previously described embodiment, the detection device is designed in such a way that it automatically triggers the brake action as a function of the simultaneous occurrence of the first and/or second signal as well as the occurrence of the third signal.

To prevent unintended automatic braking with the device in accordance with the invention, a further, particularly advantageous embodiment provides that a further circuit for detecting the time difference between the occurrence of the first and/or second signal and the occurrence of the third signal is associated with the detection device. In this case the braking process is triggered only if the first and/or the second signals as well as the third signal are simultaneously present at the detection device within a predefined time.

In order to prevent undesired injuries of passengers when the braking process is automatically triggered in connection with the device in accordance with the invention, a further, also advantageous embodiment of the device in accordance with the invention has a third sensor device which is associated with the safety belt and/or the belt buckle, in particular with all the safety belts and/or all belt buckles. In this case this third sensor device generates a fourth signal which is provided the detection device if the belt is in engagement with the belt buckle or if the belts are in engagement with the belt buckles. With this embodiment variant of the device in accordance with the invention the automatic braking process is only triggered if the first and/or the second signals as well as the third and fourth signal are simultaneously present at the detection device. It is of course also possible to connect the third sensor device and/or a further sensor device with the speedometer in such a way that, as a function of the respective speed and in particular when exceeding or falling below a predefined speed, the device in accordance with the invention is only activated if the vehicle moves within a defined speed range, for example at a speed between 1 km/h and 60 km/h. By means of this it is prevented that an automatic braking process occurs at high speeds, for example when driving on the autobahn.

In the same way the third sensor device or the previously mentioned further sensor device associated with the speedometer can be embodied in such a way that the full braking process is triggered within a first speed range, preferably within a speed range below 100 km/h, while within a speed range above 100 km/h only a partial braking process is triggered. This can be achieved in particular in that the device in accordance with the invention has a brake control system which is connected via two lines with the main brake cylinder or the wheel brake cylinders. In this case a first valve is provided in a first line which, in the above mentioned first speed range (up to 100 km/h), is opened by means of an output signal generated by the detection device, while a second valve is provided in the second line which is only opened if the vehicle moves within the above mentioned second speed range (above 100 km/h), wherein the second valve is then embodied as a reduction valve, so that only brake fluid under an appropriately reduced pressure is supplied to the main brake cylinder or the wheel brake cylinders. In other words, either the first or the second valve is opened, depending on the respective speed. This embodiment has the advantage that the total braking time is reduced even at high speeds since, with a reflex-like movement of the foot on the gas pedal, automatic partial braking already takes place via the second line and the opened second valve, so that accordingly the reaction time and the brake response time are correspondingly reduced.

To further reduce the brake response time, a further embodiment of the device in accordance with the invention provides for the brake control system to have a fluid reservoir for brake fluid under pressure. Depending on a first output signal generated by the detection device, a valve provided in a fluid reservoir is suddenly opened so that the brake fluid is abruptly supplied to the main brake cylinder and/or the wheel brake cylinders in order to trigger the desired spontaneous braking process in this way.

Another embodiment of the device in accordance with the invention has a fourth sensor device comprising at least one sensor associated with the brake pedal and/or the gas pedal. A fifth signal is then generated by the fourth sensor device as a function of the actuation of the brake pedal or the gas pedal and is provided to the detection device. When the fifth signal occurs, the detection device generates a second output signal which is also provided to the brake control system in such a way that the automatic brake process is terminated when the second output signal appears. By means of this it is achieved that, after initiation of the brake process or the actuation of the gas pedal by the device in accordance with the invention, the driver can still individually brake or accelerate his vehicle, so that with this embodiment the reaction time and the brake response time are considerably shortened, but the driver nevertheless always retains command of his vehicle during the braking process.

A further embodiment of the device in accordance with the invention comprises a detection device which is designed in such a way that the triggered automatic braking process only lasts for a predefined length of time. In other words, here the automatic brake process only lasts from approximately 0.3 seconds to approximately 1.2 seconds, preferably approximately 0.5 seconds, so that the vehicle can selectively be further braked manually, accelerated by the driver or be permitted to roll to a stop. This embodiment variant has the advantage that in those driving situations in which, based on an erroneous assessment of the traffic situation, the driver has instinctively removed his foot from the gas pedal in a reflex-like manner and moved it in the direction toward the brake pedal, which causes the triggering of the automatic braking process, this undesired automatic braking process is terminated by the detection device at the end of the previously mentioned time periods. This step, in particular in combination with the previously described embodiment, considerably contributes to the driver retaining command of his vehicle.

With the device in accordance with the invention the detection device is preferably designed as a microprocessor.

Depending on the number of sensor devices, the microprocessor then has at least a first input for receiving the signal generated by the first sensor device or the signals generated by the first sensor device, as well as at least a second input for receiving the signal generated by the second sensor device.

With the previously described embodiments of the device in accordance with the invention, having a third sensor device and/or a fourth sensor device, microprocessors are used which accordingly have additional third and/or fourth inputs in order to be able to process in this way the signals generated by the third and/or fourth sensor device.

Advantageous further developments of the device in accordance with the invention are recited in the dependent claims.

BRIEF DESCRIPTION OF THE DRAWINGS

The device in accordance with the invention will be described in detail below by means of exemplary embodiments together with the drawings. Shown are.

DESCRIPTION OF THE PREFERRED EMBODIMENT

Figure 1:
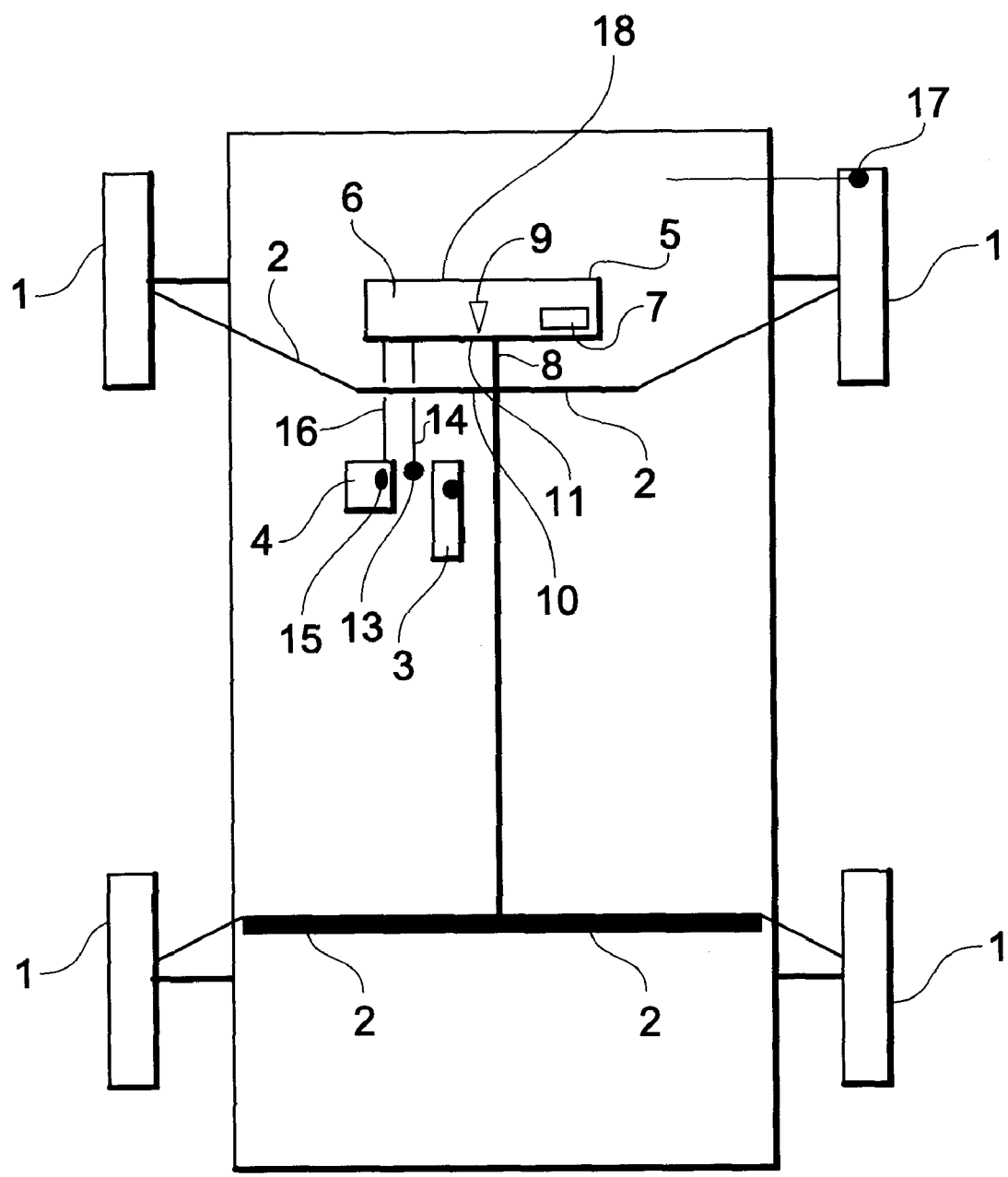
FIG. 1, a schematic representation of an embodiment of the device.
Figure 2A:
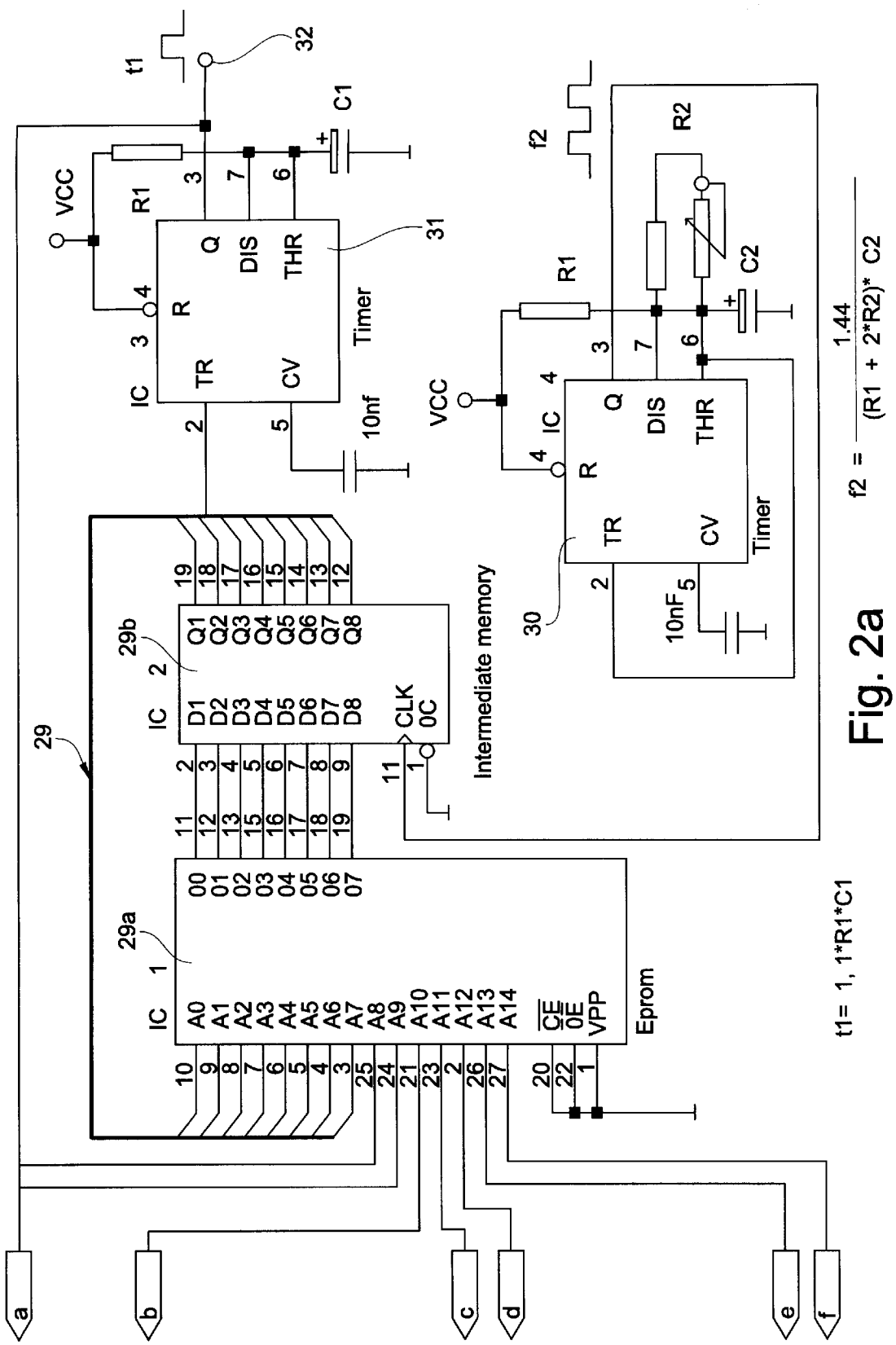
FIGS. 2a–2f, a first embodiment of an electrical circuit diagram.
Figure 2B:
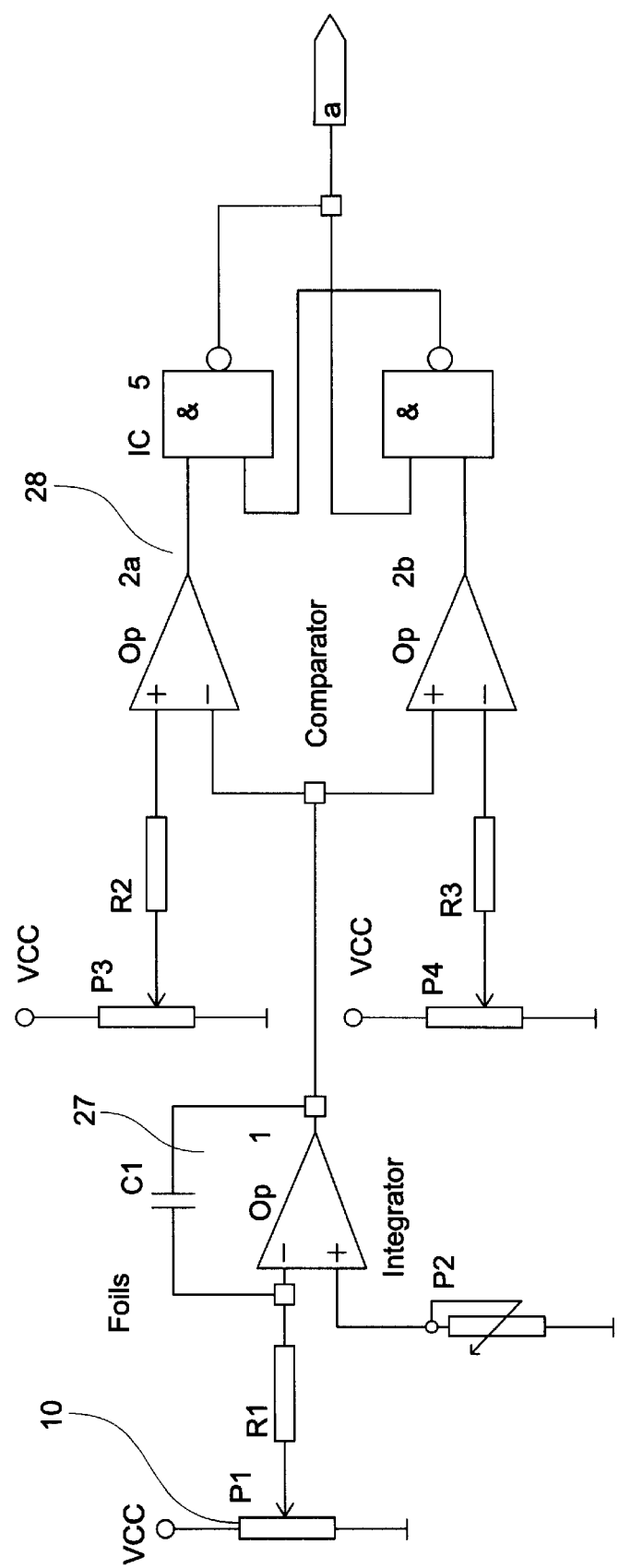
Figure 2C:
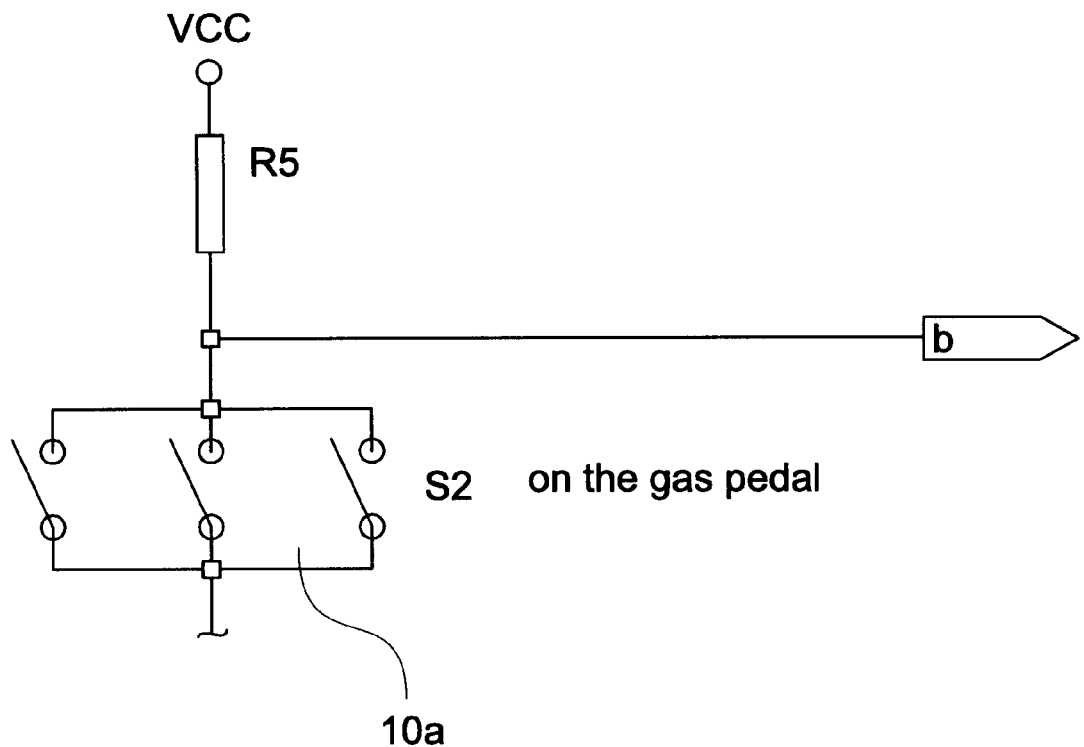
Figure 2D:
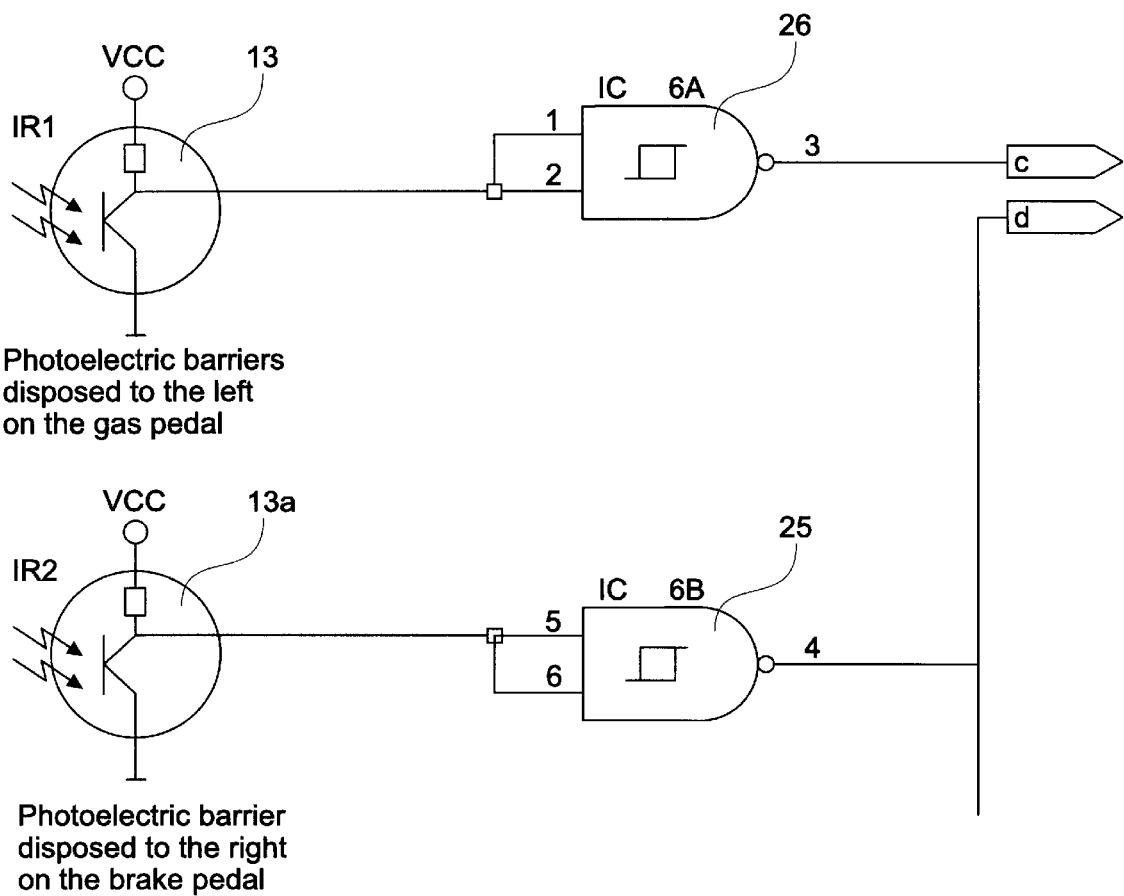
Figure 2E:
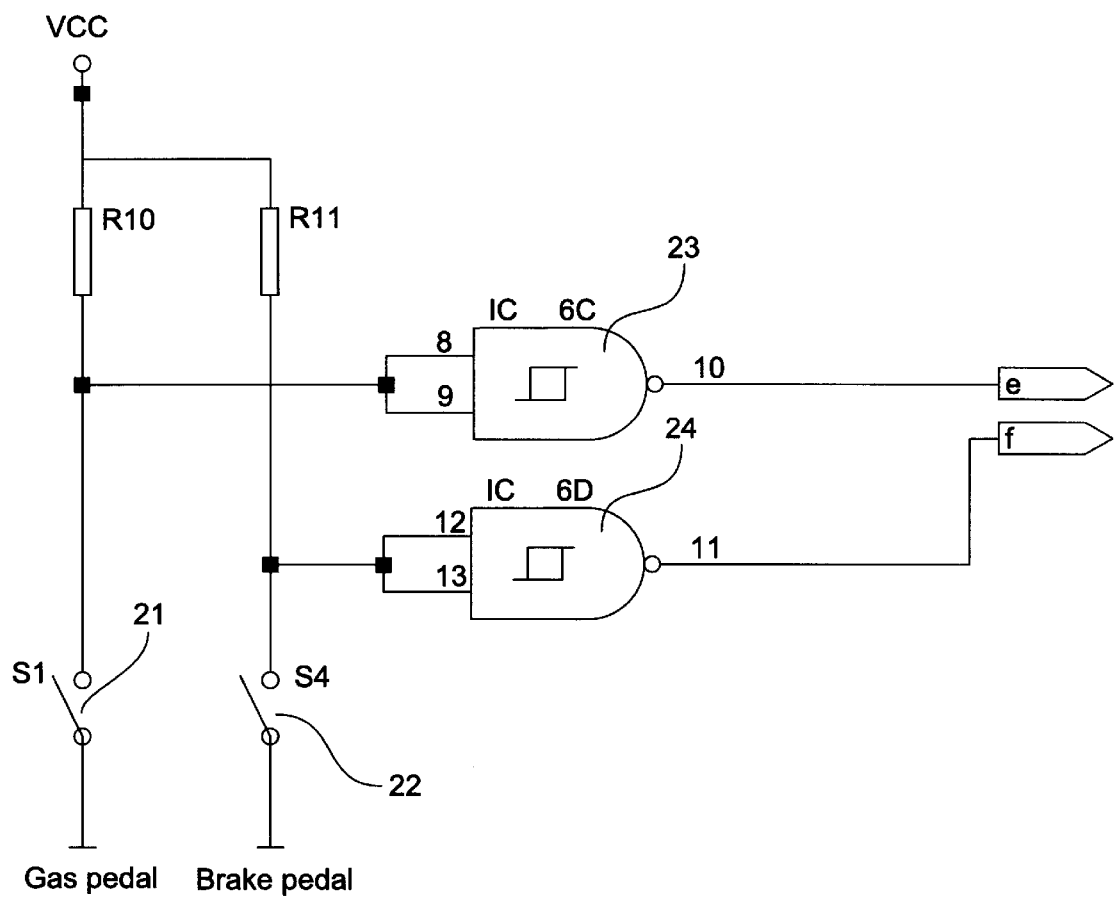
Figure 2F:
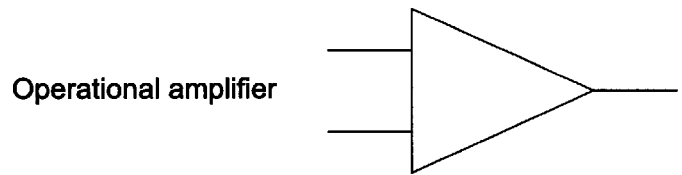
Figure 2F:
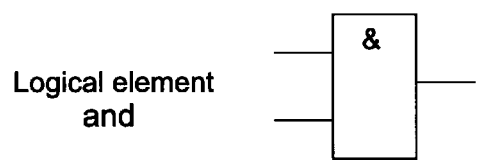
Figure 2F:
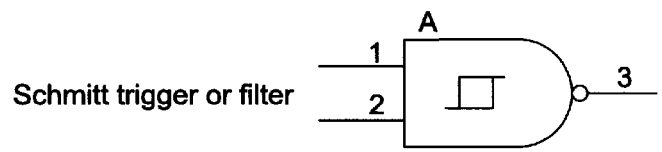
Figure 2F:
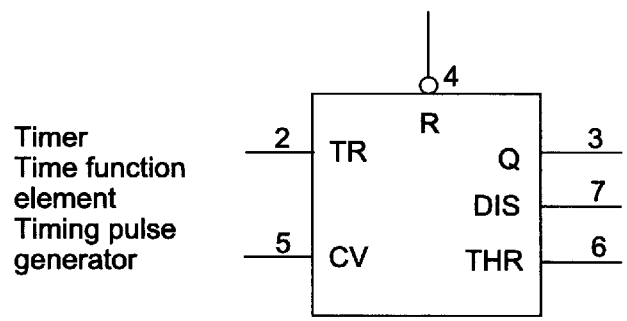
Figure 2F:
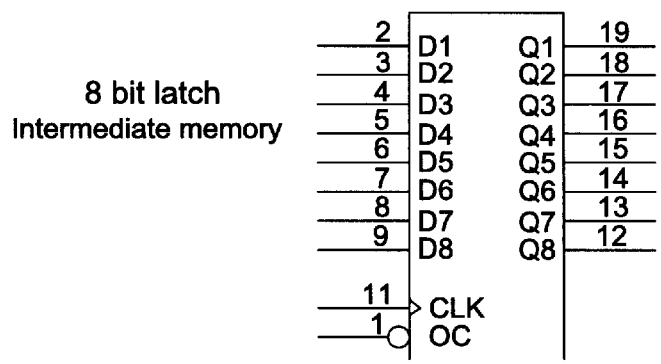
Figure 3A:
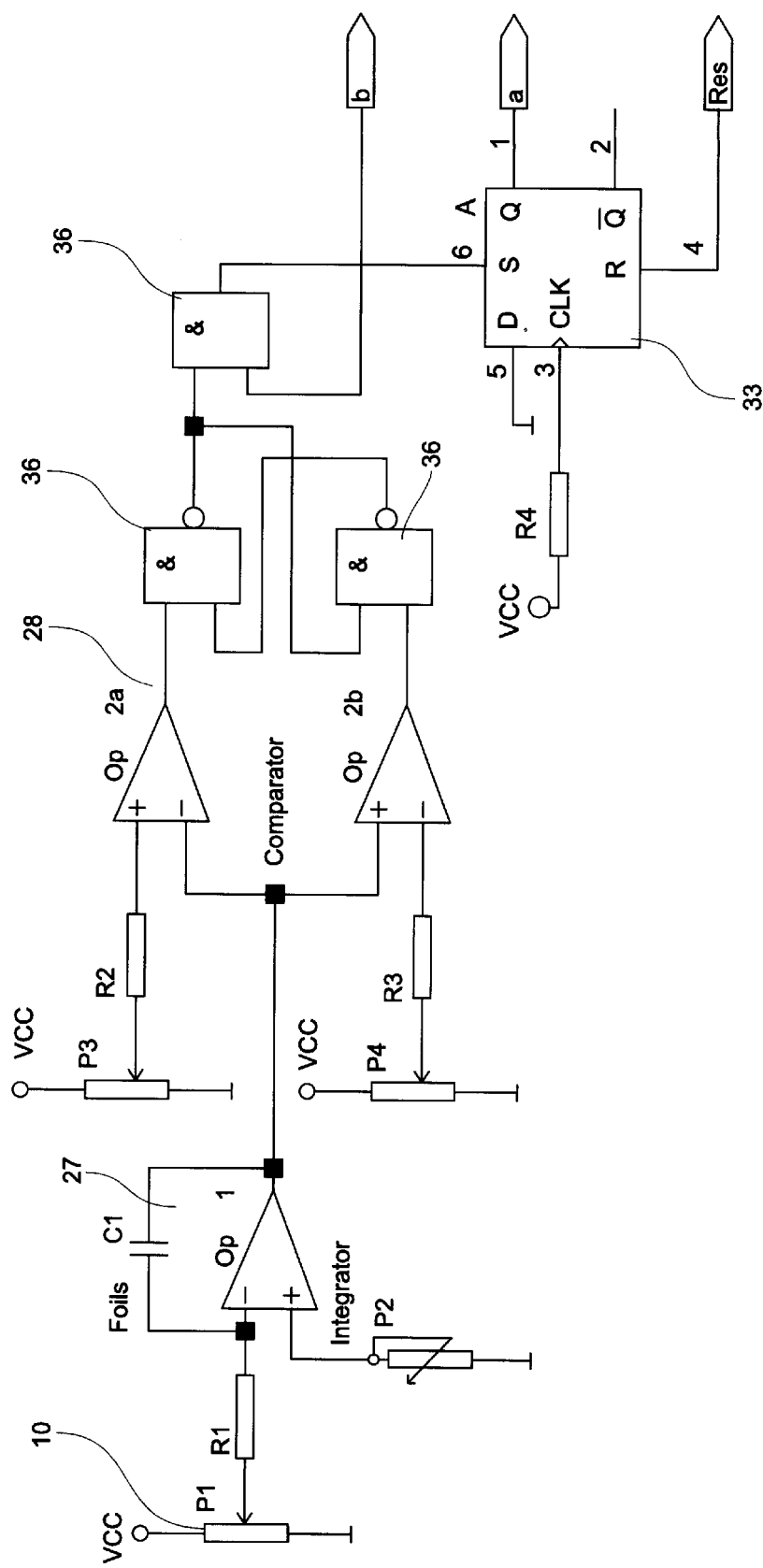
FIGS. 3a–3f, a second embodiment of an electrical circuit diagram.
Figure 3B:
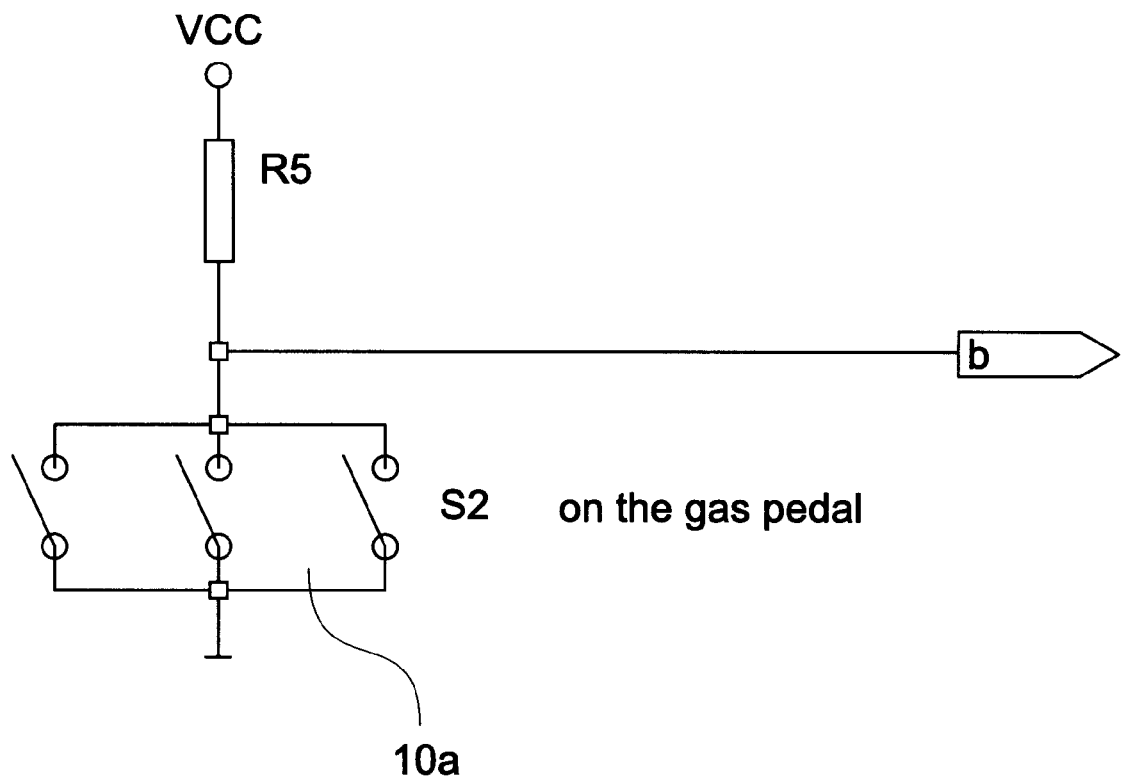
Figure 3C:
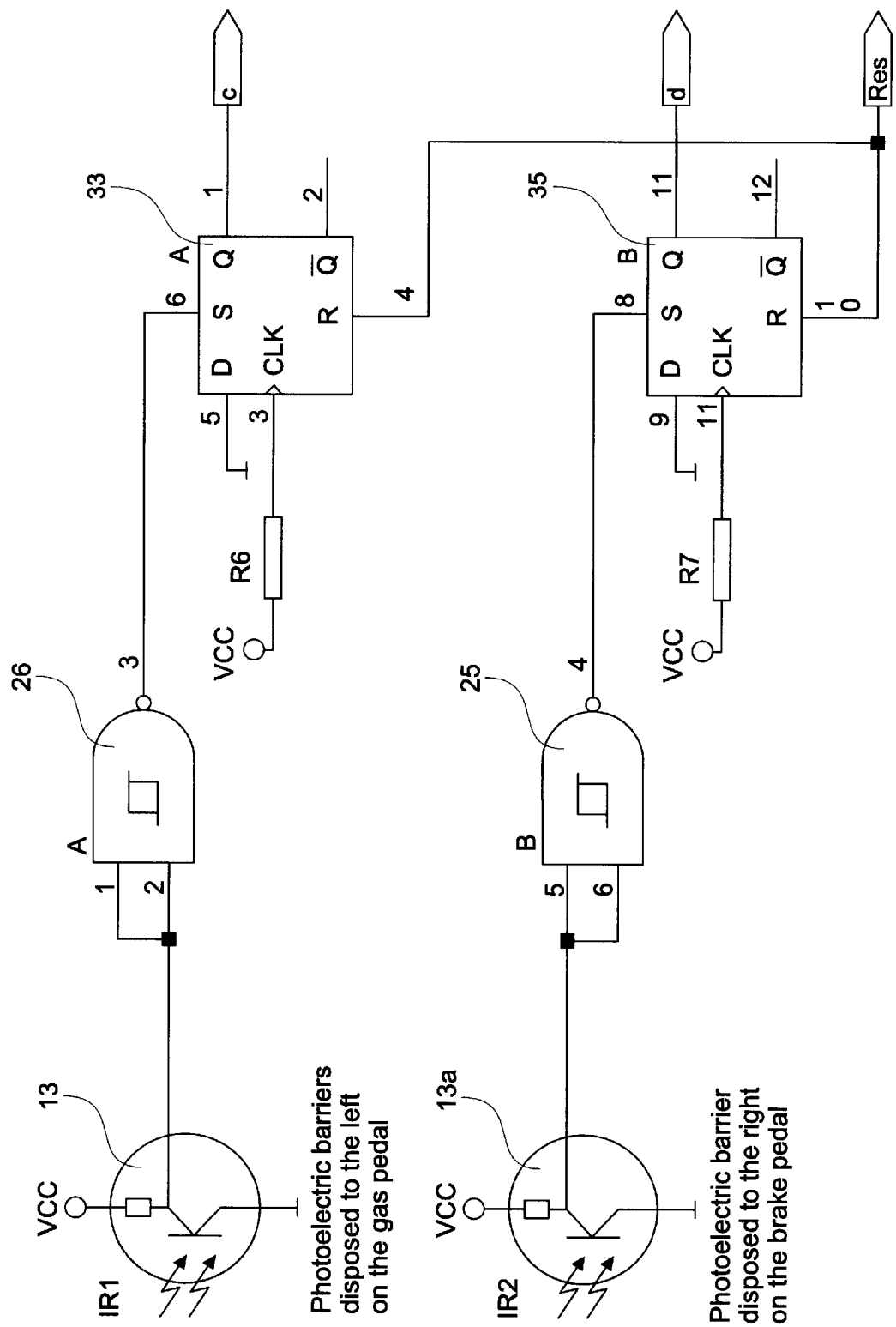
Figure 3D:
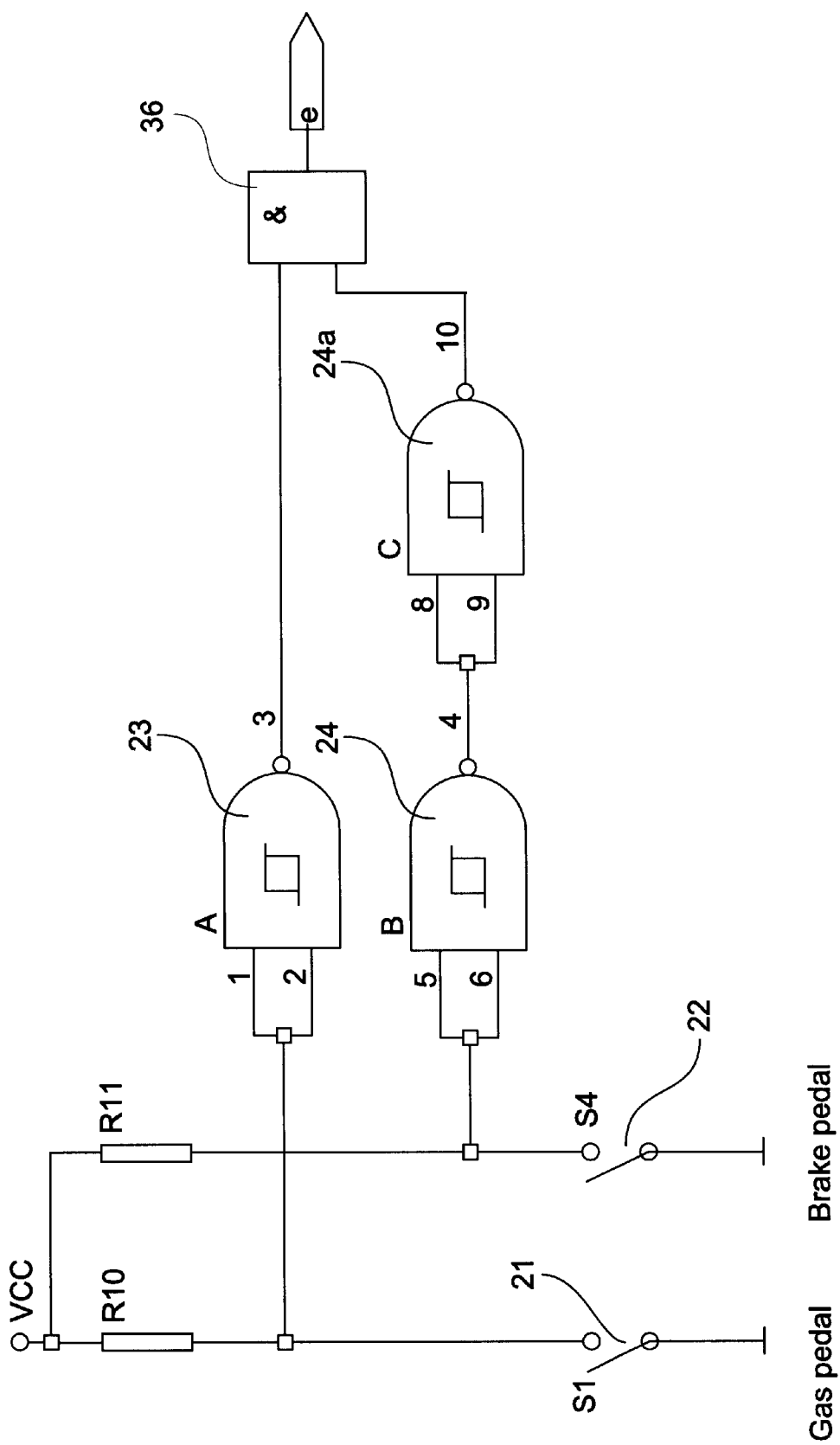
Figure 3E:
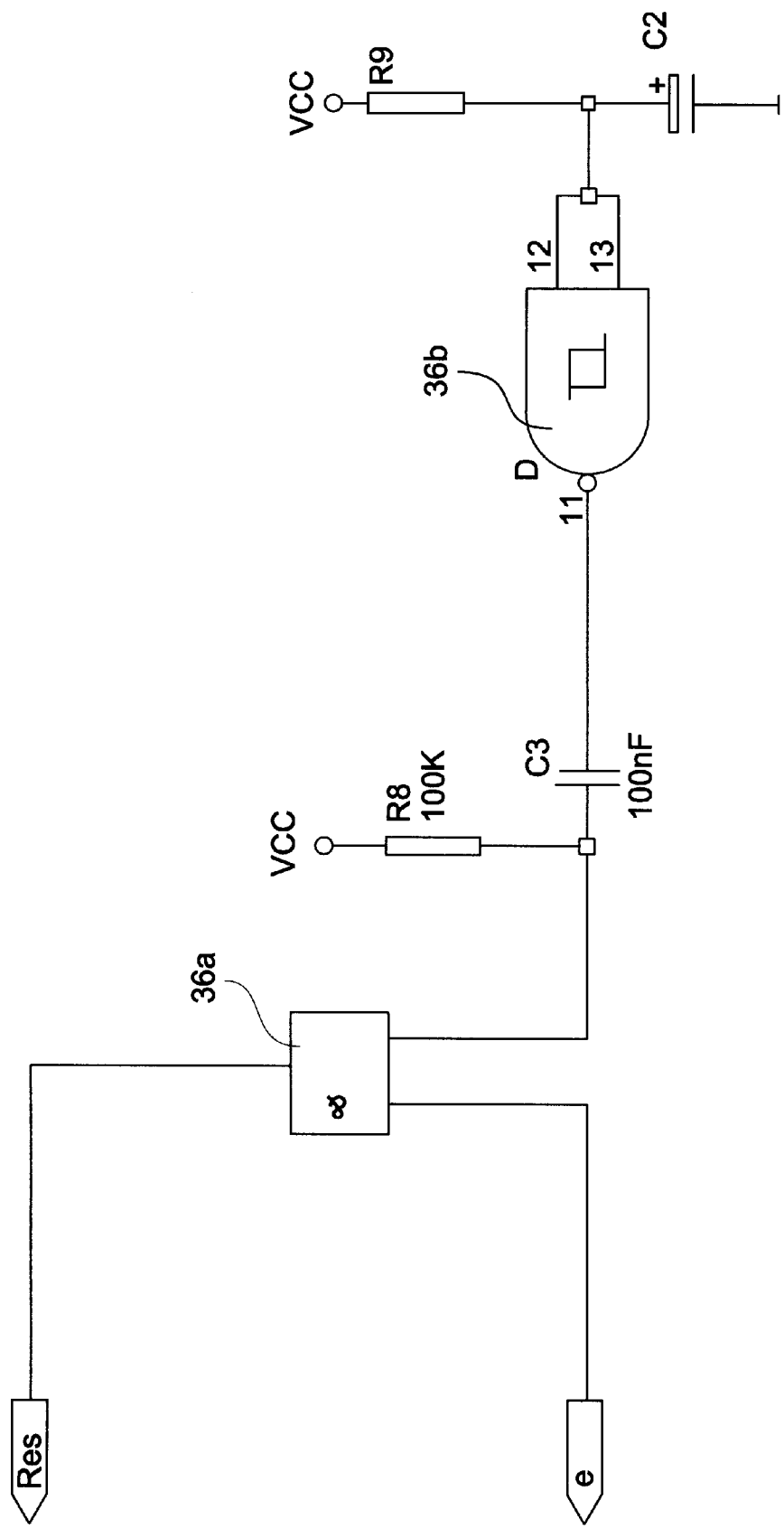
Figure 3F:
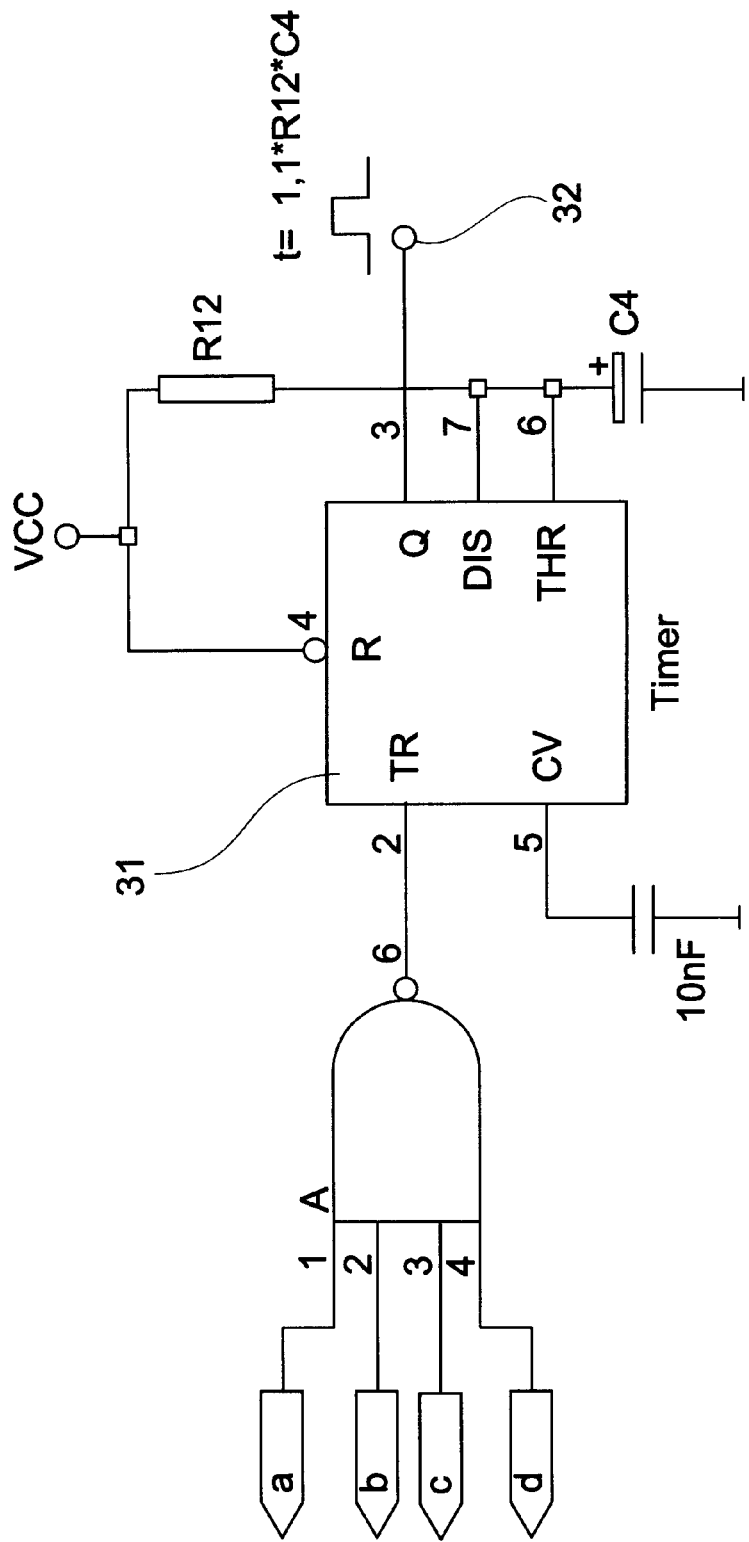

A vehicle is schematically represented in a top view in FIG. 1, wherein only the essential parts of the previously described device are shown in this drawing figure.

The vehicle has four wheels 1, wherein wheel brake lines 2 lead to each wheel 1, which originate at a main brake cylinder, not shown, and terminate in wheel brake cylinders, not shown.

Otherwise, only the gas pedal 3 and the brake pedal 4 of the vehicle are schematically shown.

A brake control system identified as a whole by 5 has a detection device 6. Furthermore, a reservoir 7 for brake fluid under pressure is disposed within the brake control system 5, wherein the reservoir 7 is equipped with an electrically actuated valve 8 in its outlet line.

An electrical line 9 leads from the detection device 6 to the valve 8.

A pressure sensor 10 is positioned underneath the gas pedal 3 and is connected with the detection device 6 in such a way that an electrical signal is supplied to the detection device 6 by the pressure sensor 10 via the interposed line 11 in case the pressure on the gas pedal is reduced in a reflex-like manner.

A second sensor device comprising the sensor 13 is positioned between the gas pedal 3 and the brake pedal 4, wherein the sensor 13 generates a third signal when the foot of the driver is moved from the gas pedal 3 in the direction toward the brake pedal 4.

A fourth sensor device comprising the sensor 15 is associated with the brake pedal 4. The sensor 15 is connected with the detection device 6 via a line 16. The sensor 15 generates a fourth signal when the brake pedal 4 is actuated by the foot of the driver.

A further sensor 17 is disposed on the right front wheel 1 and is connected via a line 18 with the detection device 6.

The above described device, shown only schematically in FIG. 1, operates as follows:

As soon as the driver reduces in a reflex-like manner the pressure on the gas pedal 3, the sensor 10 generates an electrical signal which is provided to the detection device via the line 11.

If then the foot of the driver is moved from the gas pedal 3 in the direction toward the brake pedal 4, the third signal is provided to the detection device 6 by the sensor 13 via the line 14. Because the detection device 6 comprises a timer circuit, the timer circuit checks whether the time between the appearance of the first signal and the third signal has fallen below the preset time or has exceeded it. If it has fallen below the preset time value, the detection device 6 generates an output signal which is supplied via the line 9 to the electrical valve 8 with the result that brake fluid is spontaneously supplied to the brake lines 2 from the reservoir 7 via the then opened valve 8 which, in turn, triggers an actuation of the wheel brake cylinder and in this way leads to spontaneous automatic braking of the vehicle.

If the foot of the driver touches the sensor 15 associated with the brake pedal 4, a fifth signal is supplied by this via the line 16 to the detection device 6. At the appearance of this fifth signal the detection device 6 generates a second output signal which is brought via the line 9 to the valve 8 and causes the closing of the valve 8. This results in a deactivation of the brake control system, so that then the vehicle can be continued to be conventionally braked by the driver.

The sensor 17 provided on the right front wheel generates a speed-dependent signal which is supplied to the detection device via the line 18 so that the detection device 6 and thus the above described devices are activated as a function of the respective speed. Such an activation is preferably caused in speed ranges which are usual in city traffic.

A first embodiment of a circuit diagram is represented in FIG. 2. In this case the first embodiment of the circuit diagram has a first sensor device, wherein the first sensor device consists of the sensors 10 and 10a. The sensors 10 and 10a are respectively associated with the gas pedal, wherein the sensor 10 is disposed as a pressure sensor underneath the gas pedal and is embodied as a potentiometer. An integrator 27 and a comparator 28 follow the sensor 10 in such a way that via these components the speed of the return of the gas pedal is converted into corresponding electrical signals if the driver moves the right foot back in a reflex-like manner. In this case the restoring spring of the gas pedal must be made correspondingly strong in order to make possible in this way a return movement of the gas pedal. The electrical signal generated in this way is supplied to a signal processing device 29, which consists of an EPROM 29a, an intermediate memory 29b, an oscillator 30 and a timer 31.

The second sensor 10a, which is part of the first sensor device, comprises a plurality of foil feelers, three of which are shown by way of example in FIG. 2. In this case the foil feelers S2 are applied to the surface of the gas pedal facing the driver. These foil feelers S2 register whether the foot of the driver is still on the gas pedal. Such a circuit is necessary for additionally assuring that automatic braking is not triggered by the corresponding signal of the sensor 10 during a rapid return of the gas pedal, although the foot was not moved away from the gas pedal. This is achieved in that the signal of the first sensor 10 is suppressed until the sensor 10a indicates by means of an appropriate further signal that the foot of the driver has been removed from the surface of the gas pedal.

The second sensor device is constituted by the two optical sensors 13 and 13a. In this case the sensor 13 is positioned to the left of the gas pedal and the sensor 13a to the right of the brake pedal, and both sensors 13 and 13a are designed as photoelectric barriers.

The two sensors 13 and 13a detect the position of the right foot of the driver as soon as it is moved from the first position (gas position) in the direction toward the second position (brake position). Filters are respectively interposed between the signal processing device and the two sensors 13 and 13a which, in the embodiment shown, are designed as Schmitt triggers. With a movement of the right foot of the driver these sensors generate an appropriately filtered electrical signal which is supplied to the signal processing device 29.

The circuit represented in FIG. 2 furthermore has two resilient limit switches 21 and 22, wherein the first resilient limit switch 21 is associated with the gas pedal and the second resilient limit switch 22 with the brake pedal. In this case, when the gas pedal or the brake pedal is independently operated by the right foot of the driver, these two resilient limit switches 21 and 22 are used for canceling all signals present at the signal processing device 29 in order to terminate automatic braking in this way. Here, too, filters 23 and 24, which are respectively designed as Schmitt triggers, are disposed between the respective resilient limit switches 21 and 22 and the signal processing device 29.

As already explained above, the signal processing device 29 has an EPROM 29a and an intermediate memory 29b, an oscillator 30 and a timer 31. An output signal is then present at the output of the signal processing device 29 at 32, which is supplied to the brake control system (ADS) of the vehicle and triggers automatic braking. This output signal preferably has a pulse time of 4.2 msec, wherein this pulse time can be varied at the timer 31 by adjusting the resistor R1 and the capacitor C1 in accordance with the formula $$t=1.1 \times R1 \times C1.$$

In the actual case of the pulse time of 4.2 msec, R1 is 470 kOhm and C1 8.2 1F.

The oscillator 30 provided in the signal processing device provides the intermediate memory 29b with timing pulses and actualizes the signal status.

In the second embodiment of the electrical circuit shown in FIG. 3, like components have been provided with the same reference numerals as in FIG. 2.

The essential difference between the two circuits in accordance with FIG. 2 and FIG. 3 is to be found in that in place of the EPROM 29a and the intermediate memory 29b as well as the oscillator 30, the circuit shown in FIG. 3 has three individual memories 33, 34 and 35, wherein these memories are designed as customary 1-bit memories or as flip-flops. Altogether, the circuit shown in FIG. 3 has a first assembly (I), comprising the first sensor 10, the integrator 27, the comparator 28, three logical elements 36 (AND) and a memory 33. An electrical signal is generated by this first assembly at the time the foot of the driver reduces the pressure on the gas pedal in a reflex-like manner.

The second assembly (II), comprising the second sensor 10a, corresponds to the assembly previously described in connection with FIG. 2. By means of this it is registered that the foot is still on the gas pedal, as already described above.

The third assembly (III) differs from the arrangement described in FIG. 2 in that with the embodiment shown in FIG. 3 there is a memory 34 in addition.

The fourth assembly (IV) also has a memory 35 in addition.

The fifth assembly (V) corresponds to the components already described in connection with the resilient limit switches 21 and 22, wherein additionally and in contrast with FIG. 2 a further filter 24a (Schmitt trigger) as well as a logical element 36 are provided. This fifth assembly is connected via a further logical element 36a with a sixth assembly (VI), wherein the sixth assembly, comprising the resistor R9, the capacitor C2, the capacitor C3, the resistor R8 and a filter 36b (Schmitt trigger), assures that the circuit is provided with a defined initial state.

The signals obtained from the above mentioned assemblies are collected and appropriately processed, so that an end signal of 0.4 msec is present at the output 32 of the timer 31, which is supplied to the brake control system (ABS) and in this way triggers fully automatic braking if the signals of the first four assemblies are positive and the fifth assembly is not activated.

We claim:

1. A system for controlling braking of a vehicle of the type having a gas pedal and a brake pedal adjacent one another to be operated by a foot of a driver, the vehicle braking control system comprising a detection device for actuating the braking of the vehicle, a first sensor device for detecting rapid changes in position of the driver's foot relative to the gas pedal representing a release of foot pressure applied to the gas pedal and for delivering a corresponding first signal to the detection device for automatically actuating braking of the vehicle, and a second sensor device for detecting movement of the driver's foot from the gas pedal toward the brake pedal and for delivering a corresponding second signal to the detection device for actuating the braking of the vehicle.

2. A vehicle braking control system in accordance with claim 1, characterized in that the second sensor device comprises at least one sensor that is positioned between the gas pedal and the brake pedal.

3. An arrangement for braking a vehicle with a brake control system that is associated with a detection device of a first sensor device capable of detecting the position of the driver's foot operating a gas pedal in such a manner that, in the event of a rapid change of position of the driver's foot from a first position into a second position, the detection device will send a first signal to the brake control system that will automatically trigger the braking process, characterized in that the detection device (6) is provided with a second sensor device (13) that, given a further change of the driver's foot from the second position into the third position in the vicinity of a brake pedal (4), will send a second signal to the brake control system that will cause the detection device (6) to trigger the braking process in dependence on the appearance of the second signal.

4. A device for braking in a vehicle having a gas pedal and a brake pedal adjacent one another to be operated by a foot of a driver, the vehicle braking device comprising a brake control system having a detection device (6) and a first sensor device comprising a first sensor (10) associated with the gas pedal (3) of the vehicle for supplying a first signal to the detection device in case of a reflex-like change of the position of the right foot of the driver from a first position at the gas pedal to a second position, and wherein the detection device is adapted to actuate an automatic triggering of a braking process as a function of the appearance of the first signal generated by the first sensor, characterized in that the first sensor device comprises another sensor (10a) associated with the gas pedal (3) to generate an other signal to the detection device (6) when the right foot of the driver is removed from the gas pedal, and the detection device (6) being arranged to suppress the first signal of the first sensor (10) until such time that the other sensor (10a) indicates by means of the other signal that the foot of the driver is released from the surface of the gas pedal (3).

5. A device for braking in a vehicle having a gas pedal and a brake pedal adjacent one another to be operated by a foot of a driver, the vehicle braking device comprising a brake control system having a detection device (6) and a first sensor device comprising a first sensor (10) associated with the gas pedal (3) of the vehicle for supplying a first signal to the detection device in case of a reflex-like change of the position of the right foot of the driver from a first position at the gas pedal to a second position, and wherein the detection device is adapted to actuate an automatic triggering of a braking process as a function of the appearance of the first signal generated by the first sensor, characterized in that a second sensor device comprises an other sensor (13), positioned between the gas pedal (3) and the brake pedal (4) of the vehicle, for generating an other signal to the detection device upon movement of the right foot of the driver from the first position toward the brake pedal (4), the detection device (6) being arranged to trigger the braking process only as a function of the appearance of the other signal.

6. A device in accordance with claim 4 or characterized in that the first sensor (10) associated with the first sensor device is disposed underneath the gas pedal (3).

7. A device in accordance with claim 4 or 5, characterized in that the first sensor (10) associated with the first sensor device is embodied as a pressure sensor.

8. A device in accordance with claim 7, characterized in that the pressure sensor (10) generates a signal when the speed of the pressure change exceeds a predetermined value.

9. A device in accordance with claim 4 or 5, characterized in that the detection device (6) has a circuit for detecting the time difference between the appearance of the first signal and the appearance of the other signal, wherein the braking process is triggered only if the first and the other signal are present simultaneously at the detection device (6) within a predetermined time.

10. A device in accordance with claim 4 or 5, characterized in that a third sensor device is associated with a safety belt device, wherein the third sensor device is arranged to provide the detection device with a third signal if the belt device is engaged, and wherein the detection device is arranged to trigger the braking process only if the first, another and third signals are simultaneously present at the detection device (6).

11. A device in accordance with claim 10, characterized in that the detection device (6) comprises a microprocessor having a third input for receiving the signal generated by the third sensor device.

12. A device in accordance with claim 4 or 5, characterized in that the brake control system has a fluid reservoir (7) for a brake fluid under pressure and a valve at the fluid reservoir, the detection device being arranged to open the valve as a function of a first output signal generated by the detection device (6) to trigger the braking process.

13. A device in accordance with claim 4 or 5, characterized in that a fourth sensor device (15) is associated with the brake pedal (4) to deliver to the detection device (6) a fourth signal as a function of the actuation of the brake pedal (4), the detection device (6) being arranged to provide the brake control system with an output signal when the fourth signal appears to terminate the automatic braking process.

14. A device in accordance with claim 13, characterized in that the detection device (6) comprises a microprocessor having a fourth input for receiving the signal generated by the fourth sensor device.

15. A device in accordance with claim 4 or 5, characterized in that the detection device (6) comprises a microprocessor.

16. A device in accordance with claim 5, characterized in that the detection device (6) comprises a microprocessor having at least a first input for receiving the signals generated by the first sensor device, as well as at least one second input for receiving the signal generated by the second sensor device.

\* \* \* \* \*